(12) United States Patent
Martin et al.

(10) Patent No.: US 8,826,116 B2
(45) Date of Patent: Sep. 2, 2014

(54) CREATING ANNOTATIONS OF TRANSIENT COMPUTER OBJECTS

(75) Inventors: Sean J. Martin, Boston, MA (US); Simon L. Martin, Hursley (GB); Chetan R. Murthy, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1465 days.

(21) Appl. No.: 10/949,684

(22) Filed: Sep. 24, 2004

(65) Prior Publication Data

US 2006/0075205 A1    Apr. 6, 2006

(51) Int. Cl.
G06F 17/00 (2006.01)
G06F 17/30 (2006.01)

(52) U.S. Cl.
CPC .............................. G06F 17/30887 (2013.01)
USPC .......................... 715/230; 715/232; 715/233

(58) Field of Classification Search
USPC ........................ 715/512, 511, 230, 232, 233
See application file for complete search history.

(56) References Cited

U.S. PATENT DOCUMENTS

| | | | |
|---|---|---|---|
| 6,519,603 B1 | 2/2003 | Bays et al. | 707/102 |
| 6,721,921 B1 * | 4/2004 | Altman | 715/210 |
| 6,871,318 B1 * | 3/2005 | Wynblatt et al. | 715/201 |
| 6,956,593 B1 * | 10/2005 | Gupta et al. | 715/751 |
| 6,983,417 B2 * | 1/2006 | Kagimasa et al. | 715/255 |
| 7,418,656 B1 * | 8/2008 | Petersen | 715/230 |

OTHER PUBLICATIONS

U.S. Appl. No. 10/600,316, filed Jun. 20, 2003, J. A. Albornoz et al., "Management and Recovery of Data Object Annotations Using Digital Fingerprinting".
"Digital Signatures: How They Work", PC Magazine, Apr. 9, 1996.

* cited by examiner

*Primary Examiner* — Stephen Hong
*Assistant Examiner* — Matthew Ludwig
(74) *Attorney, Agent, or Firm* — William A. Kinnaman, Jr.

(57) ABSTRACT

A method, system and program product for annotating a transient state of a computer displayed application enables annotation of transient applications particularly web based applications. A transient application address (or key) and state information related to an application at a transient state are stored in an annotation store along with an annotation. The annotation is related to the transient application by the application address or key. The application is automatically restored to the transient state when the annotation is requested. Optionally a screen capture of the application at the transient state is also presented.

37 Claims, 19 Drawing Sheets

CREATING ANNOTATIONS OF TRANSIENT COMPUTER OBJECTS

FIELD OF THE INVENTION

The present invention is related to computer data handling. It is more particularly related to managing and annotating digital data objects.

BACKGROUND OF THE INVENTION

An annotation system is one where descriptive information is stored about objects, or parts of objects, without modifying the objects themselves. Annotation systems exist in which annotations are stored in the data stream of the target objects themselves. Such systems have many disadvantages. In a preferred annotation system, annotations are stored separate from the target data source. This provides a great deal of flexibility in managing the data source and its associated annotations. The separate annotation store system is the subject of the present invention and will be referred to as simply the "annotation store" herein. Annotation systems are in high demand in Life Sciences and biotech, but not limited solely to that domain.

An annotation store, typically a database, contains the descriptive information for the annotation. An indexing scheme is used to map each annotation to the target object or the position within the target object. We refer to the objects (collections of bytes of data) that are potential targets for annotations as "data sources". Annotation systems can have client components ranging from a standalone annotation program to annotation plug-ins that integrate with third party vendor software.

Digital fingerprints are described in "Digital Signatures: How They Work" in Apr. 9, 1996 PC Magazine. A digital fingerprint is a computable identifier for a given set of bytes. Desirable properties of a digital fingerprint include conciseness (for ease of storage and transmission), uniqueness (to avoid different sets of bytes having the same fingerprint), determinism (the same fingerprint should always be computed for the same set of bytes), and ease of computation (to facilitate quick computation of a large number of fingerprints). One popular example of a digital fingerprint is the MD5 hash algorithm, which calculates a 128-byte digital fingerprint for a given collection of bytes.

An annotation is referred to as "lost" when it is not able to be retrieved by a user working with the data source to which the annotation is targeted. A data source is referred to as "lost" when it is not able to be recovered by a user who has retrieved an annotation on that data source via an external process, such as an annotation search or an annotation browser.

U.S. patent application Ser. No. 10/600,316 "MANAGEMENT AND RECOVERY OF DATA OBJECT ANNOTATIONS USING DIGITAL FINGERPRINTING" assigned to IBM incorporated herein by reference teaches an annotation system using digital fingerprinting.

As shown in that application, the prior art annotation system (referring to FIG. 4), the following procedures are used in creating, storing, and retrieving an annotation: First, a user 401 retrieves and opens 402 the target data source, "DS", from a location 405, "L". Examples of "L" include a network location (e.g. Internet URL "intranet.server.com/files/my_spreadsheet.xls"), a local path (e.g. "c:\data\article20a.pdf"), or a content-management identifier (e.g. "MyCMS:Store:98a021"). The user then creates the annotation 403, "A", by entering the information that comprises "A". The annotation store 407 records the relationship between "A" and "L" 404. If the user creates another annotation, "A2" on the data source from "L", then a relationship between "A2" and "L" will also be recorded in the annotation store. Thus, there is a many-to-one relationship between annotations and data-source locations within the annotation store.

Referring to prior art FIG. 5, when a user 501 later opens 503 "DS" from location "L" 405, the annotation store 406 is queried for all annotations associated with "L". In the above scenario, both "A" and "A2" 505 would be returned 504, and the user can work with the annotations and their target data source.

Referencing prior art FIG. 6, a user 601 may access "A" or "A2" using an external mechanism, such as an annotation search 603 or browser interface. In this case, the annotation store 605 is queried for the location at which the target data source can be found. Because "A" (or "A2") is related to "L1", "L1" is returned to the user and, once more, the user can work with both the annotation and its target data source.

The traditional annotation system, examples shown in prior art FIGS. 4-6, has many shortcomings. For example, referring to prior art FIG. 7, consider the case in which "DS" is accessed from a location other than "L". (For example, this might occur if a second user sends "DS" as an email attachment to a user 706). Thus we have the case of a user 706 accessing "DS" from a new location, "L2". When the annotation store 705 is queried 704 for all annotations related "L2", nothing is returned, and the annotations "A" and "A2" are lost.

A second shortcoming example (prior art FIG. 8) involves scenarios in which the user 804 accesses the annotation "A" through an external search 805 or browser mechanism and attempts to locate the target data source "DS". As before, the annotation store returns location "L", but if "DS" no longer exists at "L" (for example, if a local copy of an article was annotated prior to the article being moved 802 to a content-management system 803), then "DS" will be lost.

An annotation system is one where descriptive information is stored about objects, or parts of objects, without modifying the objects themselves. An annotation store, typically a database, contains the descriptive information for the annotation, and an indexing scheme is used to map each annotation to the location of the object or the position within the object. Annotation systems are in high demand in Life Sciences and biotech, but not limited solely to that domain.

Today annotation is generally performed on objects denoting (but not limited to) images, drawings, spreadsheets, web pages and word processing documents by storing a reference to the annotation against a known position in the structure of any of these objects. This is accomplished by using a named position in one of these objects data models (a well known pre-defined structure) that will give absolute positional information or as some manner of a measured byte offset within the file that makes up the object (also a well known structure) or as spatial co-ordinates mapped onto a rendered view of the object when it is an image for example. In all these cases, the general structure of the object being annotated is pre-defined and well known and is generally stored as a whole object or as parts that make up the whole object.

In a typical usage scenario, users (for the purpose of this document the word "users" denotes software programs in addition to individual end users) can open an object for viewing at which time the annotation store is queried for the existence of annotations associated with that object and if any are found, the user can also view them. Alternatively, the user is otherwise made aware of the annotations as they are matched to the appropriate place in the existing well known structure of the object concerned. In another mode the user might search the annotations database store and find annotations, which list the objects to which they apply.

Using the method of annotation described above, it is not possible to annotate data or views in application programs for which where there are no well known, (single or multiple) relatively static object structures stored against which the annotation system can use to map a point of reference to the annotation. Furthermore, in many application programs the objects, which are used to render a view to the user, are transitory and are established dynamically during the users interaction with that application (for instance a user navigating web pages). Consequently there is no persisting object against which the annotation store can use as the reference to which an annotation may be usefully related. This is particularly true of systems where the application program does not include a pre-designed annotation capability as part of its standard functionality.

There is a need to be able to annotate unstructured or transient objects.

SUMMARY OF THE INVENTION

It is the goal of this invention to provide a method for annotating application views for which there is no persistent object against which the annotation can be referenced.

Annotations are associated with sequences of application operations who's purpose is to drive the application program to the exact program state in which they annotation was originally created. At the moment of creating of the annotation, this sequence of operations can be either automatically or manually synthesized and then stored in an annotation store along with the annotation. When a user views an application on which such an annotation is made, they are made aware that the annotation exists. They are additionally provided with the capability to view the annotation in the context in which it was made. If they select this option, the sequence of operations are automaticly performed to achieve the state of the application program at the time of the original annotation is retrieved from the annotation store and used to impel the application to that state after which the annotation can be shown to the user in the correct context.

It is an object of the invention to establish view recreation specific information using specialized annotation client software to extract application program and view state information from the application at the time of the annotation.

It is another object of the invention to store this view and program application state re-creation specific information in a database along with the annotation associated with that particular application state and view context.

It is yet another object of the invention to, in the event that recording application state information is not possible, or only partially possible, or even if it is possible but it is felt that the following step would add additional informational value, the specialized annotation software client should be capable of performing a screen capture(s) as a bitmapped image(s) relevant portions of the screen(s) viewed or as directed by the user performing the annotation and offer that image(s) for further clarifying markup in the form of electronically altering the image(s) by the user creating the annotation to establish additional context for the annotation prior to storing such an image(s) in the annotation store.

It is further an object of the invention to make available to a user a list of previously stored annotations associated with that program application or that program application in the context of a particular data source (or some other course grained key) for selection or further processing or informational purposes.

It is further an object of the invention to, at a later time, be capable of using the previously stored view recreation specific information to programmatically impel the application program to the application state and view context it was in at the time a user made the associated annotation.

It is an object of the invention to additionally be capable of displaying any previously captured and marked up image(s) of the annotating users view at the time of the associated annotation creation.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DESCRIPTION OF THE PREFERRED EMBODIMENTS

Figure 1:
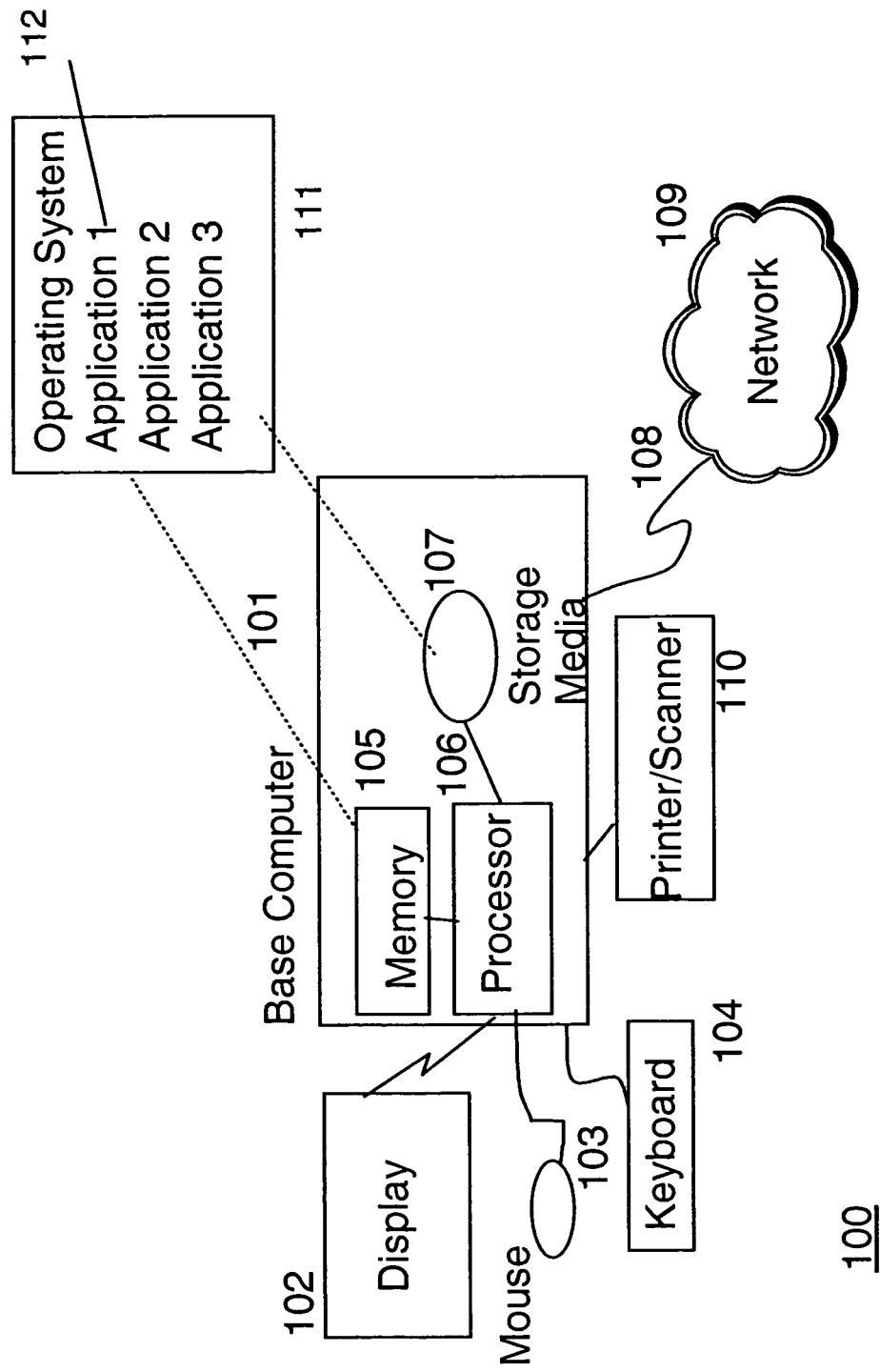
FIG. 1 is a diagram depicting components of a computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
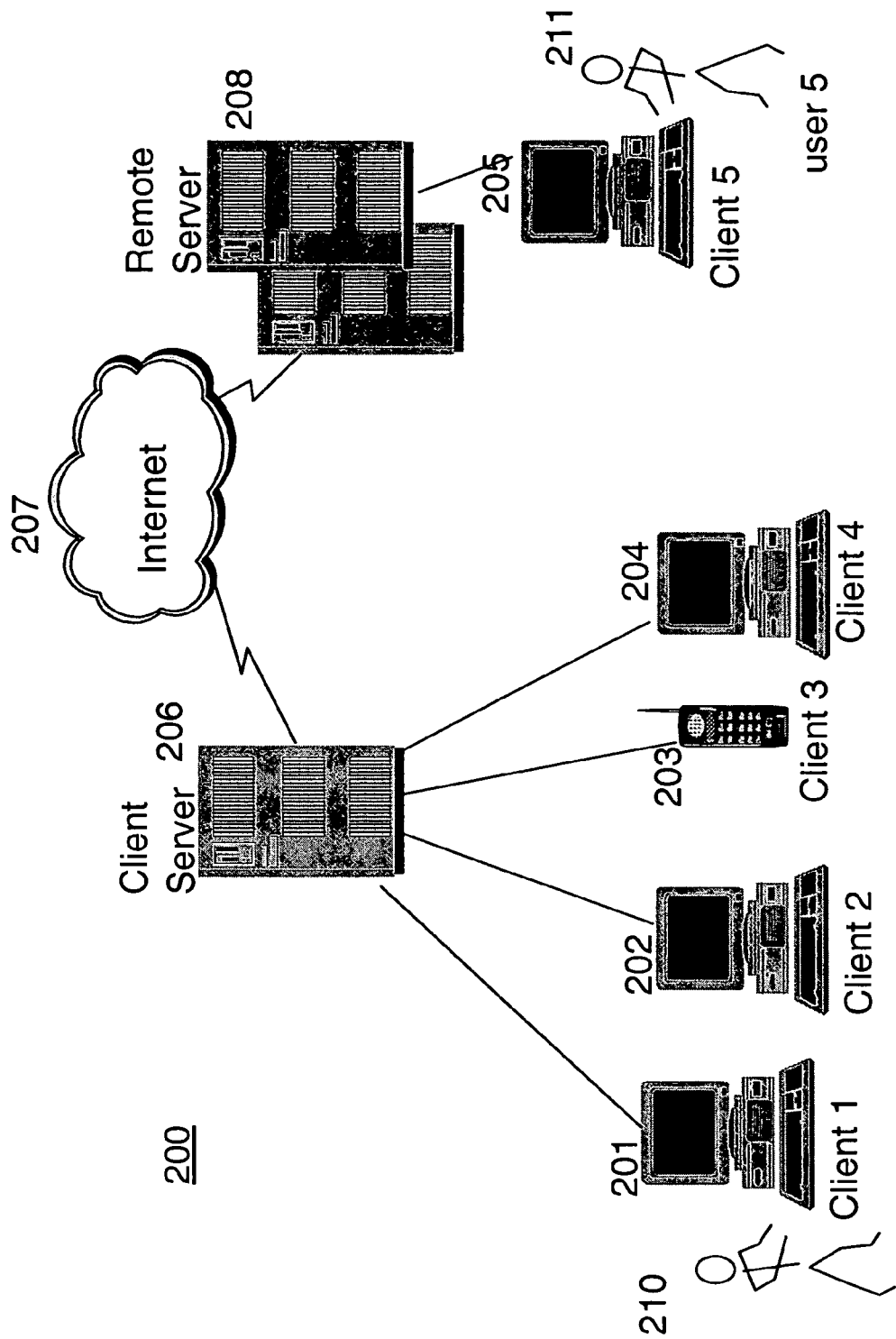
FIG. 2 is a diagram depicting a network of computer systems.
Figure 3:
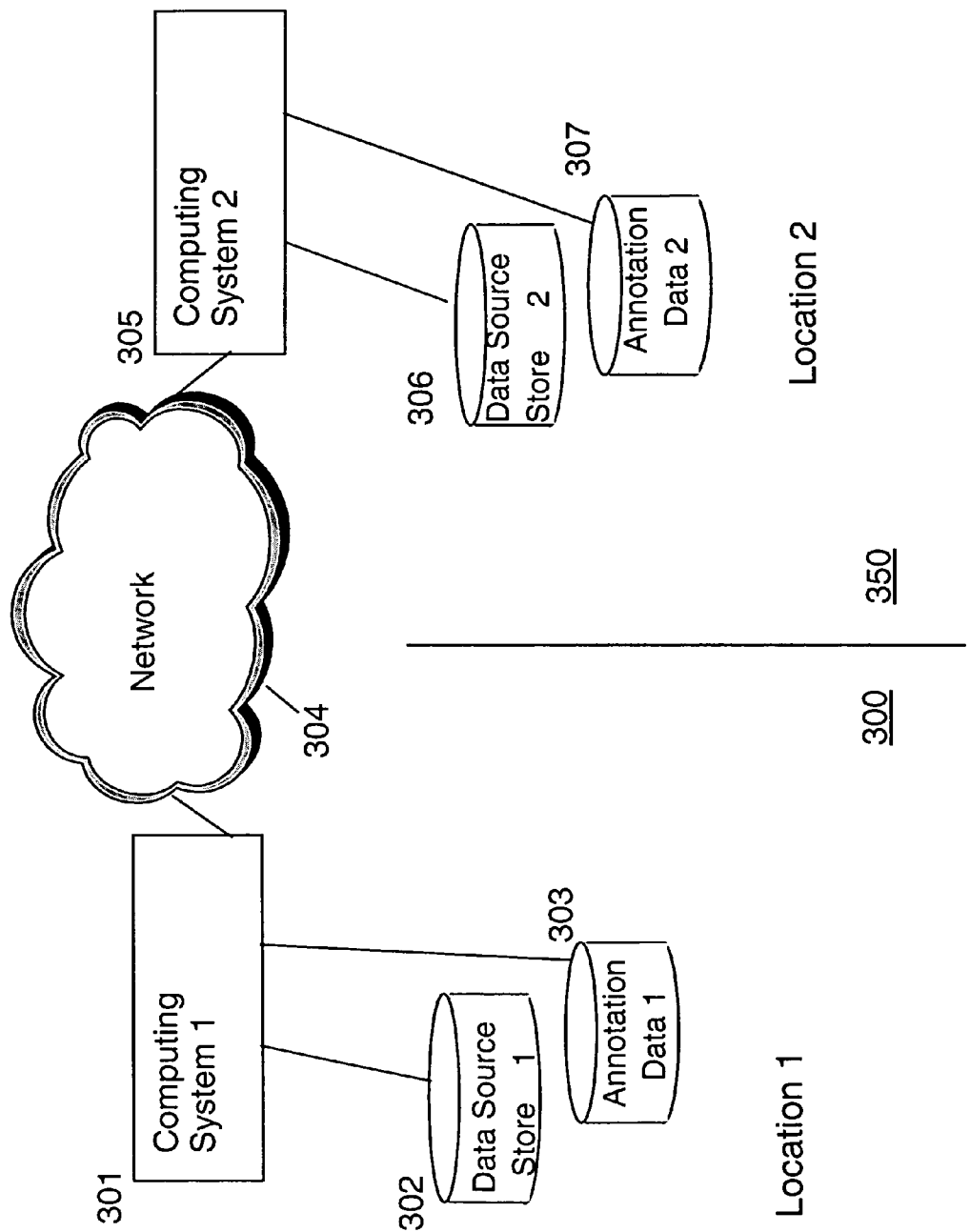
FIG. 3 is a depiction of annotation databases.
Figure 4:
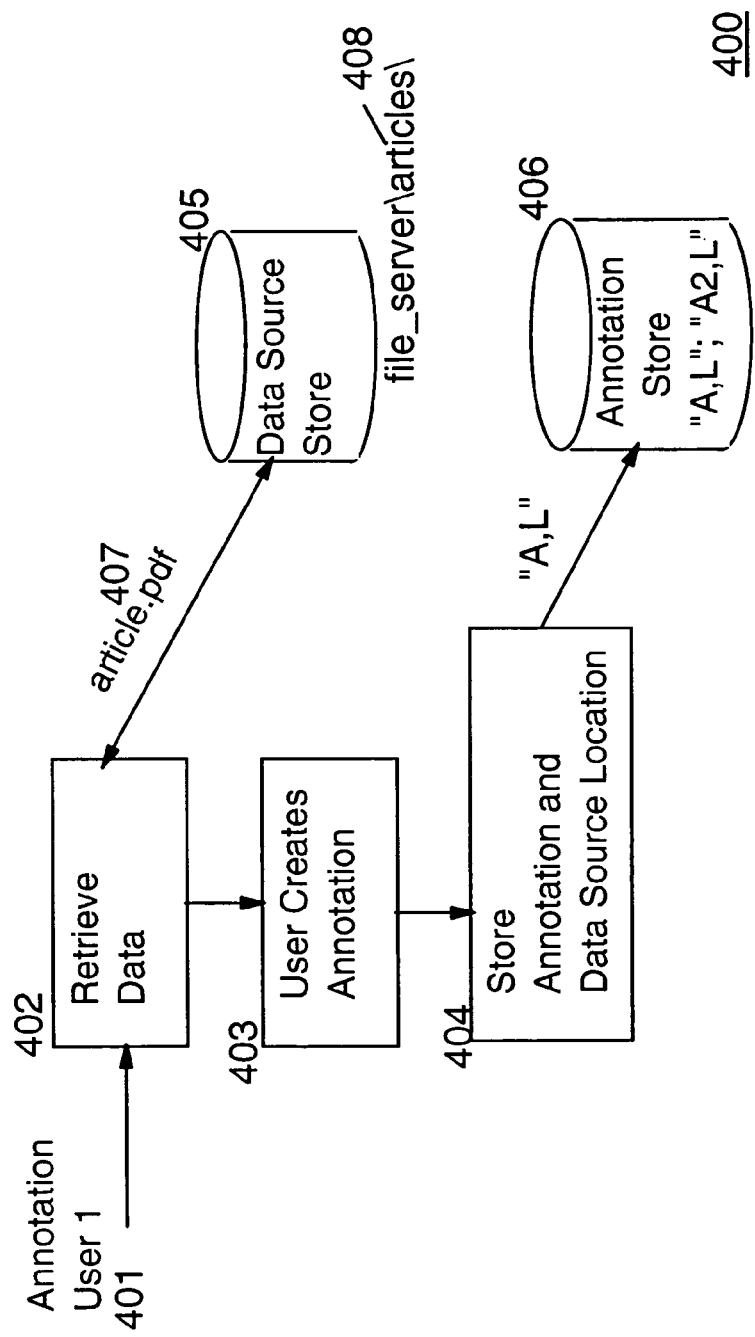
FIG. 4 is an illustration of prior art creating annotations.
Figure 5:
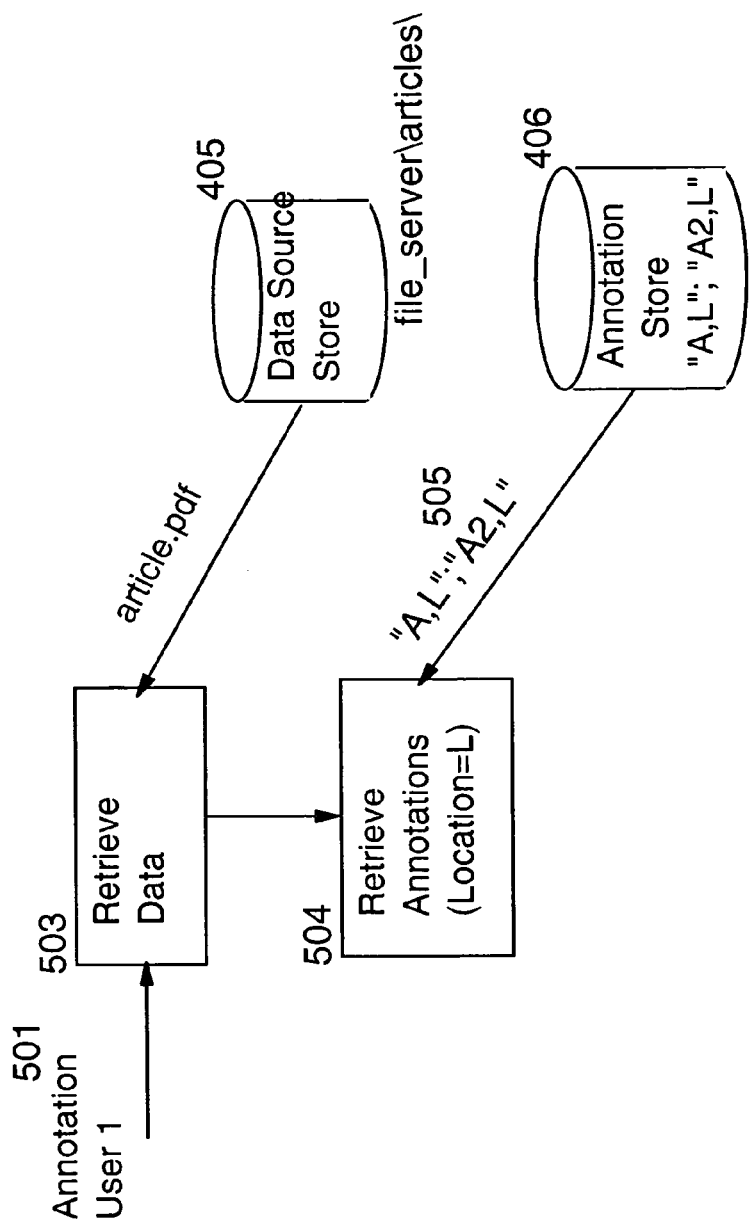
FIG. 5 is an illustration of prior art retrieving annotations for a data source.
Figure 6:
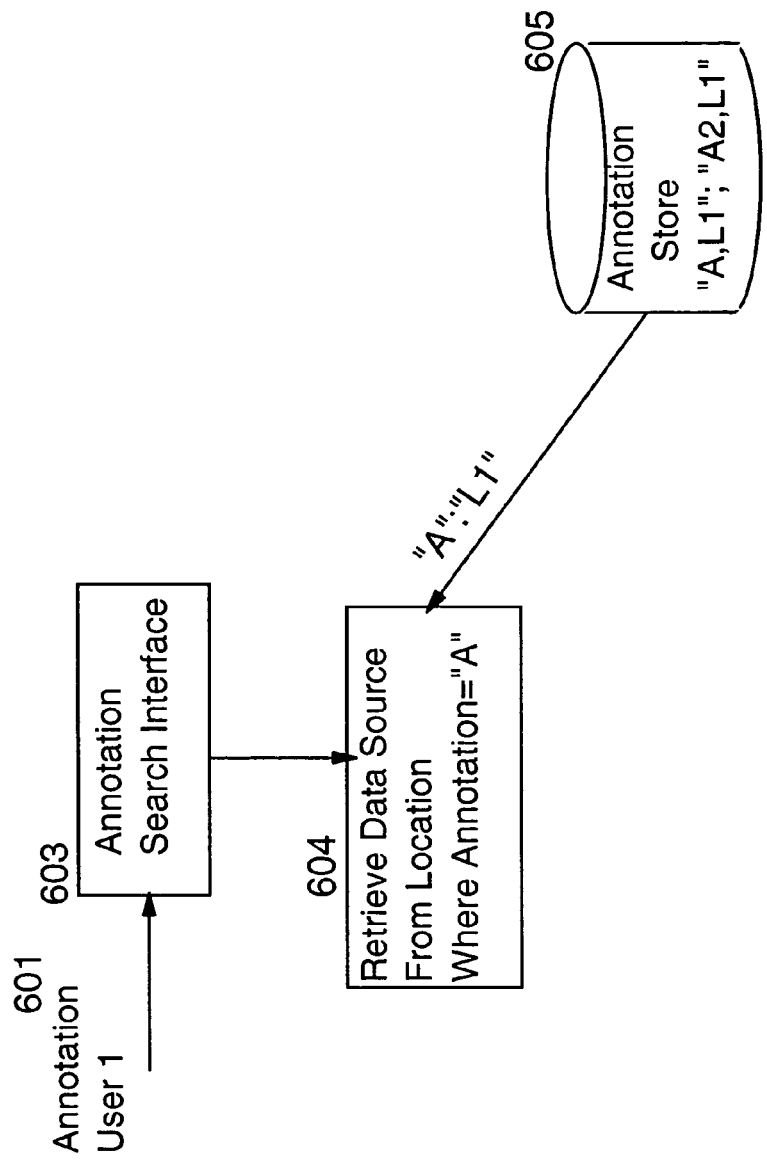
FIG. 6 depicts prior art retrieving Data Sources.
Figure 7:
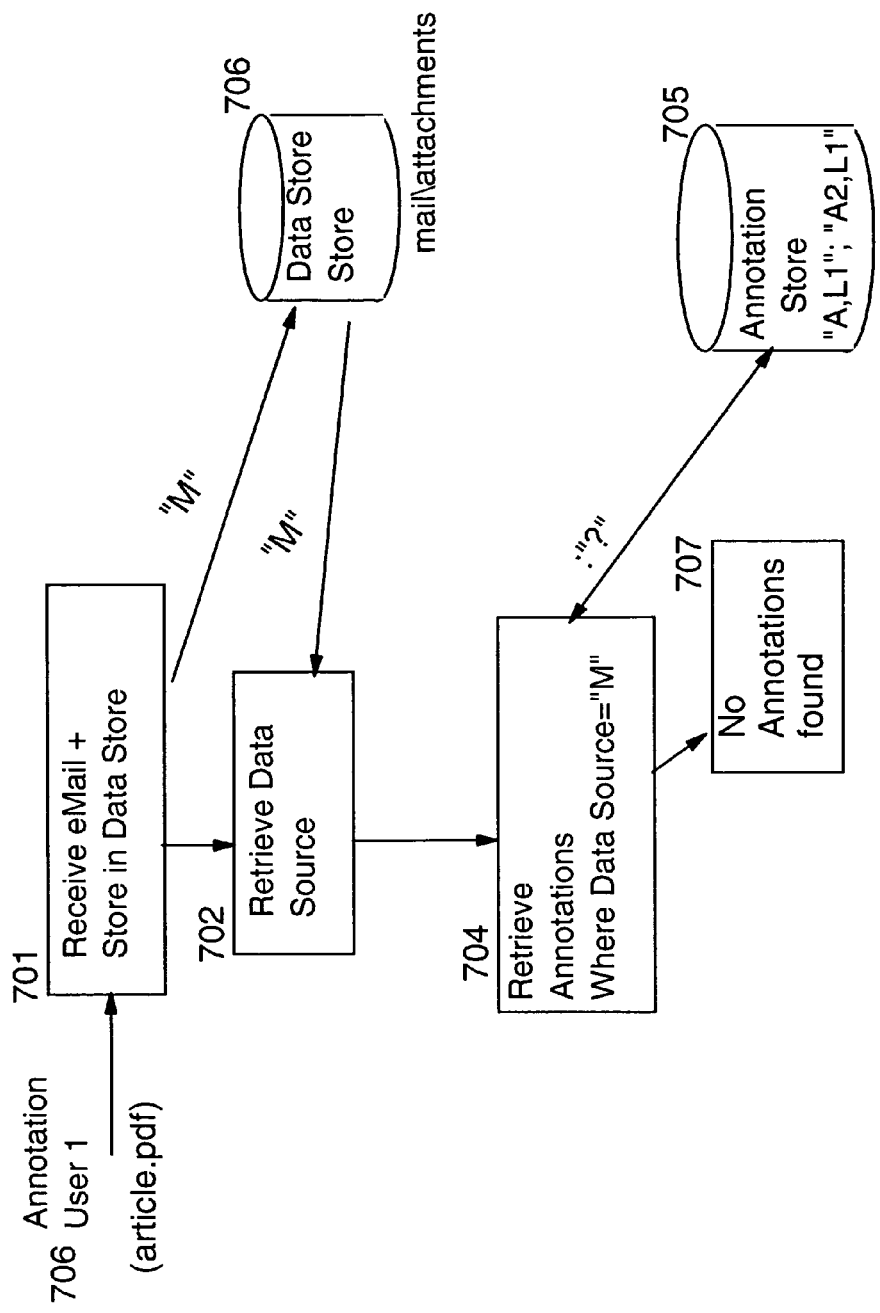
FIG. 7 depicts prior art annotation and data source retrieval.
Figure 8:
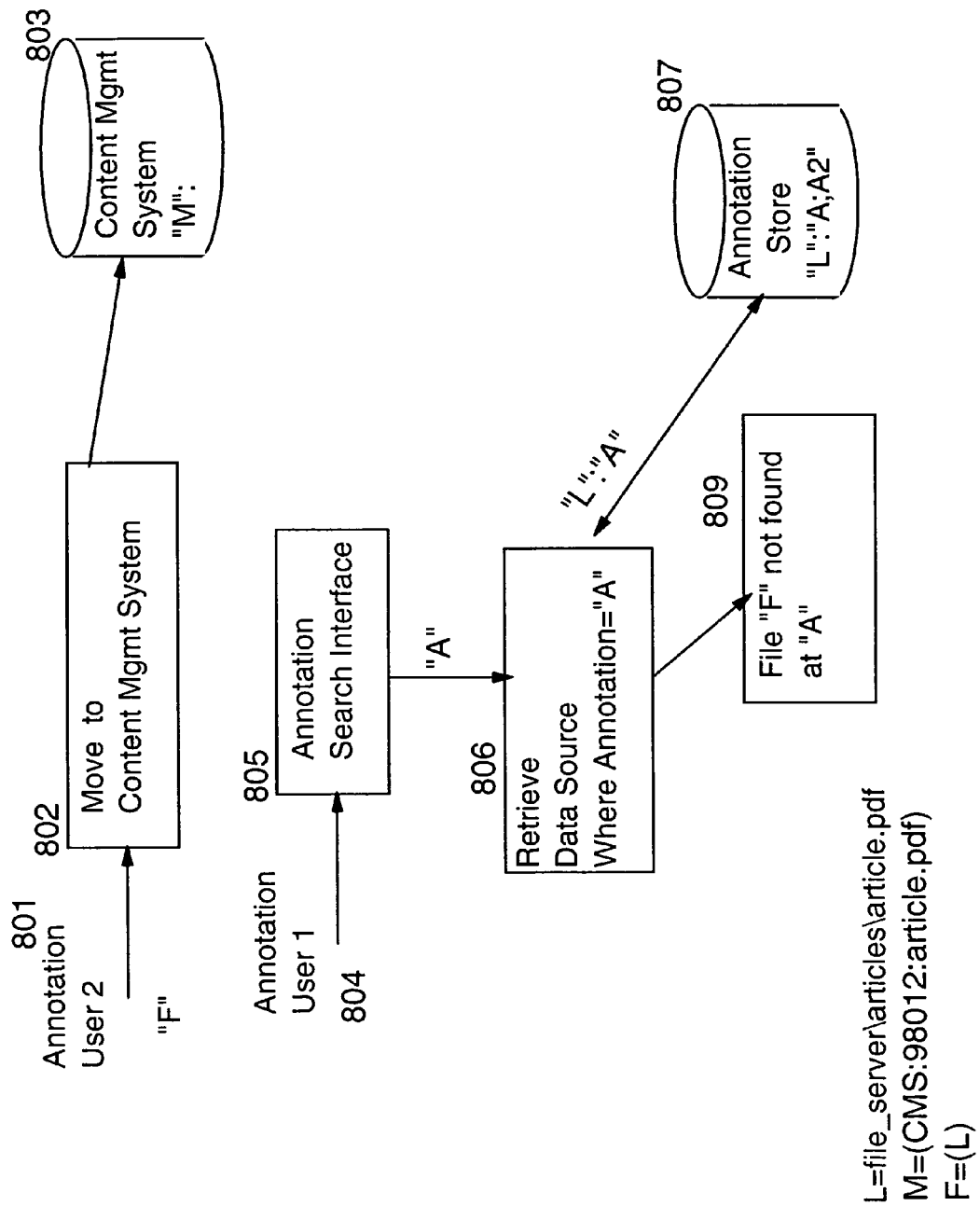
FIG. 8 depicts prior art storing annotations.

FIG. 2 illustrates a data processing network 200 in which the present invention may be practiced. The data processing network 200 may include a plurality of individual networks, such as a wireless network and a wired network, each of which may include a plurality of individual workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 using a communications link. The gateway computer may be implemented utilizing an IBM eServer zserver 900 Server available from IBM.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

In the preferred embodiment, the present invention is implemented as one or more computer software programs 111. The implementation of the software of the present invention may operate on a user's workstation, as one or more modules or applications 111 (also referred to as code subroutines, or "objects" in object-oriented programming) which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that application, without deviating from the inventive concepts disclosed herein. The application 111 may be executing in a Web environment, where a Web server provides services in response to requests from a client connected through the Internet. In another embodiment, the application may be executing in a corporate intranet or extranet, or in any other network environment. Configurations for the environment include a client/server network, Peer-to-Peer networks (wherein clients interact directly by performing both client and server function) as well as a multi-tier environment. These environments and configurations are well known in the art.

U.S. Pat. No. 6,519,603 "Method and system for organizing an annotation structure and for querying data and annotations" assigned to IBM presents a method and system for capturing annotations about database material in a way that allows queries with predicates or conditions on both the database material and the annotations and is incorporated herein by reference.

U.S. patent application Ser. No. 10/600,316 "MANAGEMENT AND RECOVERY OF DATA OBJECT ANNOTATIONS USING DIGITAL FINGERPRINTING" assigned to IBM teaches linking objects to annotation objects using digital fingerprinting and is incorporated herein by reference.

Annotations are associated with sequences of application operations whose purpose is to drive the application to the exact state in which the annotation was originally created. This sequence of operations is either automatically or manually synthesized and stored with the annotation.

Preferably when the user opens an application, all the annotations with that application are listed. This list of annotations is associated with either the application itself or optionally with data being loaded into the application. The user selects one of the annotations from this list and has the application "driven" to the state of the application at which the annotation was originally created. Additionally a snapshot bitmap of the current application view is optionally opened. The bitmap having been stored along with the annotation. Presenting the snapshot allows the user to view the application state before driving the application into this state. It also provides a view of the application if the application can not return to its annotation state.

Figure 9:
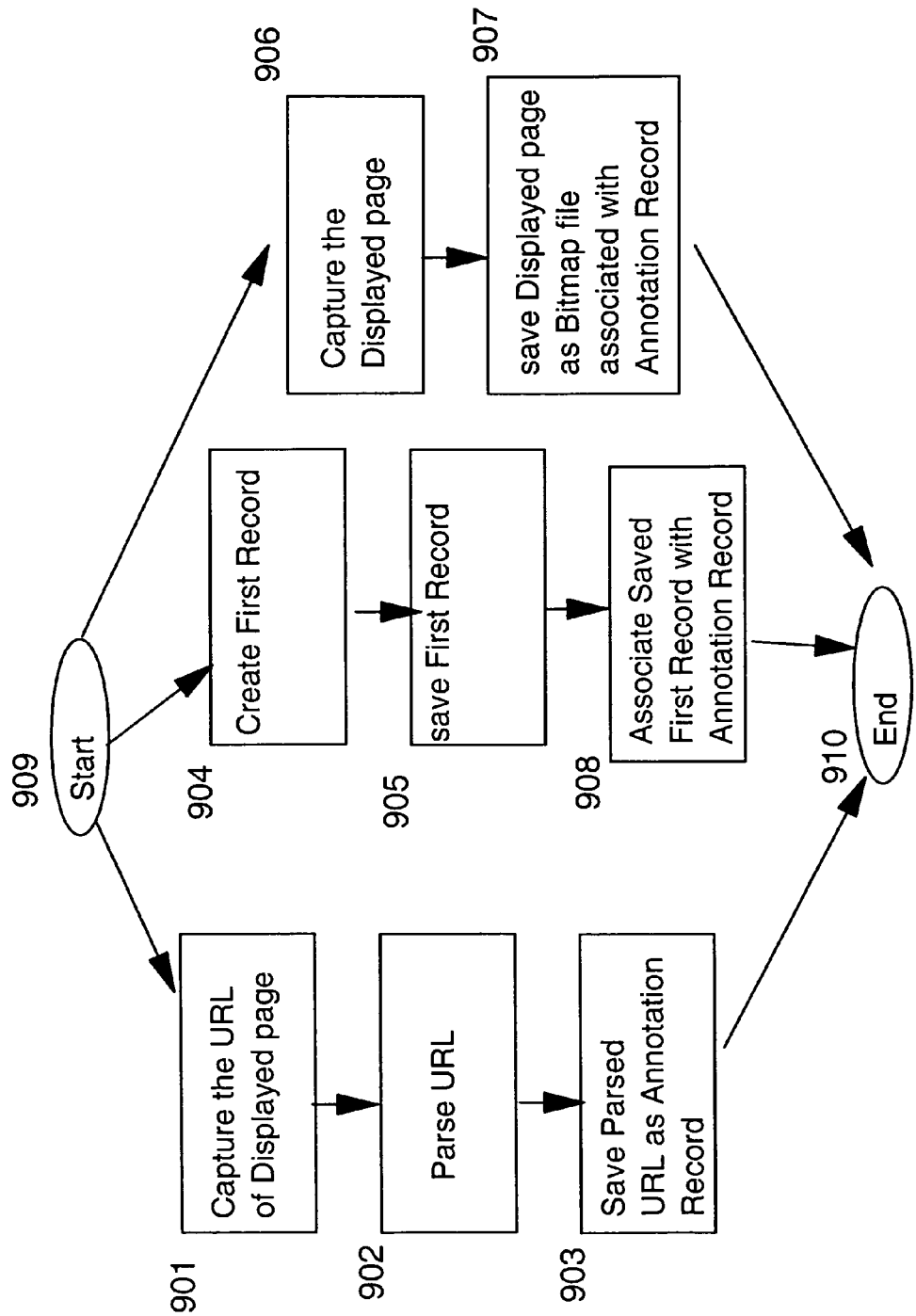
FIG. 9 illustrates a high level flow of events of the present invention.

Referring to FIG. 9 in one embodiment, a user navigates a web site to a transient web page of interest. An annotation is made on the view created for the user by an annotation application program that makes use of a web browser as its display mechanism. In this example 909 the annotation client software captures the URL of the transient application displayed by the browser 901 then breaks apart (parses) 902 the URL string reference to this view in order to distinguish between the URL part which refers to the application program and the other URL part which is specific to the current view the user is experiencing. This is the URL that a web browser will display to users when they are viewing for instance the structure of a protein molecule for which the data is stored in a database by the Protein Databank at pdb.org having the following URL:

"www.rcsb.org/pdb/cgi/explore.cgi?job=graphics;
pdbId=1AFT;opt=sh ow&size=250"

The portion of the URL that refers to the application program contains information about where the application program is executing (a computer named "www.rcsb.org") and what the name of the application program is ("/pdb/cgi/explorer.cgi"). The remainder of the URL, separated by the ("?" character "job=graphics;pdbId=1AFT;opt=show&size=250"), contains enough application program state information to recreate the exact view (state) being annotated for a user and is what the annotation store will save 903 with any annotations made on this view of the application program. In order to recreate this view of the application, so as to display an annotation in its original context, the annotation program must retrieve the previously stored application program state information from the annotation store and to make use of it to programmatically direct the application at the Protein Databank to its state at the time of the annotation by navigating the web browser to the correct view and then showing the annotation.

The application program provides a mechanism for the user to create an annotation record 904 and save the record 905 preferably in the annotation store wherein the record is associated 908 with the annotation record containing the parsed state information (parsed URL) 903.

In another embodiment, the annotation client software examines the internal program state of the application being annotated to collect and to store with the annotation enough information to be able to recreate the view currently being displayed at a later time. Application program state metrics that are recorded to obtain this information include (but are not limited to) the data source that is being used to create the view for the user, what database views on that data are actually open, what display components are in use for those views, the window sizes of those display components, which database record(s) is active or selected, what regions of the screen had been selected, and where the cursor is currently positioned. Specialized annotation client software capable of this functionality is developed for each application program being rendered annotation capable. This specialized annotation client software is made capable of using the information gathered and stored with the annotation to programmatically direct the application program to establish the application view at the time of the users annotation, at a later point in time. Preferably, application programs provide means to export this state information either as a file or as a computer memory variable that the specialized annotation client software takes advantage of for this purpose.

If the annotation client software is not capable of gathering all the software required to recreate the user's application program's current view, the annotation client software captures 906 the application screen as a bitmap image (screen capture) that is stored 907 along with the annotation to later aid a user in establishing the correct context for an annotation made earlier. This screen capture image is preferably offered to the user performing the annotation for additional markup (annotating the image) prior to storage in the annotation database system.

Figure 10:
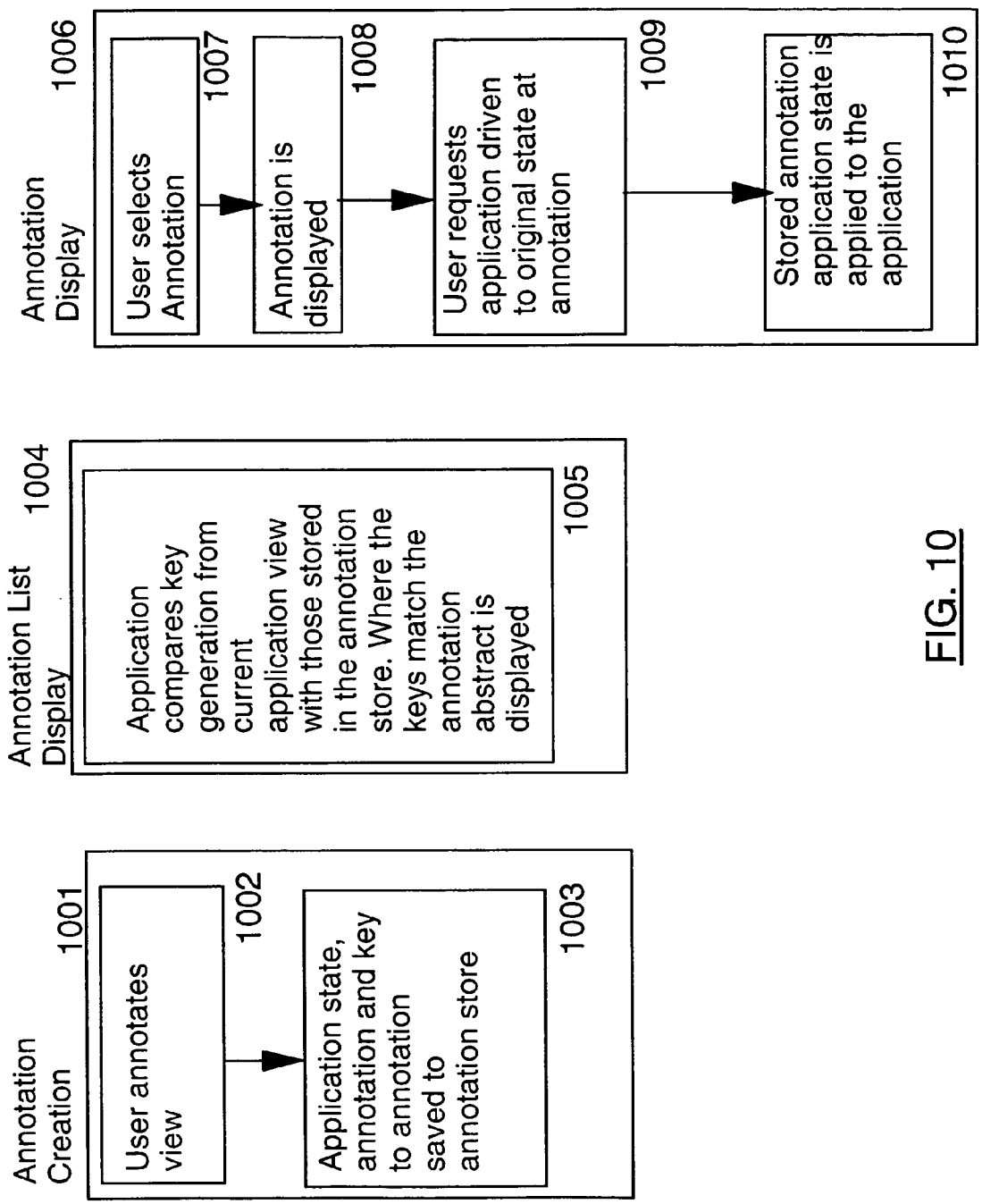
FIG. 10 illustrates the functionality of the present invention.

Referring to FIG. 10, an annotation of a transient web application is created 1001 by a user annotating a transient view 1002. State information about the transient view is saved in an annotation store 1003 along with a Key to the annotation. Preferably the key and state information is derived from a web URL of the transient page where the Key portion indicates the state of the transient web page.

When a user is interested in annotations, an annotation application preferably lists 1004 in a display, indications (abstracts) of annotations related to a current applicant view 1005. The annotations associated with the current view are preferably determined by use of a Key associated with the current view. In a preferred embodiment, the Key is derived from the domain/application portion of a web URL.

When the user sees 1006 an annotation in the list 1004 of interest, he selects 1007 the annotation using a GUI method known in the art. The Annotation is displayed 1008 preferably in a separate window and the application is driven to the transient state of the annotation 1009 preferably by a GUI method initiated by the user. The application is displayed at the transient state associated with the annotation 1010. Optionally, a screen capture of the application is displayed, the screen capture displaying a representation of the display at the time the annotation was created.

In an example embodiment an annotation plugin extension is provided for the Spotfire® DecisionSite™ suite from SPOTFIRE, INC., described in "An Introduction to Spotfire® DecisionSite™ Analysis Builder" Version 1.0 November 2003. (Spotfire® DecisionSite™ is a graphical data analysis tool for engineers, researchers, analysts and knowledge workers. Spotfire® DecisionSite™ has been designed with a plugin extension framework allowing the tool to be extended.) This plugin extension framework has a set of API's (application programming interfaces) allowing a plugin developer to add visual elements to spotfire as well as access to the data currently loaded within Spotfire® DecisionSite™.

In a preferred embodiment, an annotation plugin is created and associated with Spotfire DecisionSite via the API interface. In the embodiment, once a researcher has decided on an application view to annotate, the novel annotation plugin of the present invention uses the data loaded into the applications to create a unique key for the annotation as well as saving the applications view state. The unique key is generated from an export of the data currently stored in SPOTFIRE. This key is preferably generated using the MD5 hashing algorithm on this exported data. MD5 is a one-way operation that transforms a data string of any length into a shorter, fixed-length value. No two strings of data will produce the same MD5 hash value thereby giving a unique key for the data currently stored in Spotfire® DecisionSite™. The current view state defines the visual output of Spotfire® DecisionSite™. This includes details such as which particular types of graph are being viewed, the ranges of data which is being viewed and the general state which the application is currently in. Spotfire® DecisionSite™ allows for this view state data to be saved separately from the data which is currently under investigation. This view state data is saved in a custom binary file format. This view state binary file is preferably stored along with the unique annotation key and the annotation itself in a relational database. Whenever a data set is loaded into Spotfire® DecisionSite™ the annotation plugin compares a unique key created from the newly loaded data set with the unique data keys stored with the annotations. Wherever there are matches the annotation (or a summary of the annotation) is preferably displayed to the researcher. There are multiples of these annotations. The researcher selects the annotation and has the annotation plugin apply the stored view state binary file to the data set. This, in effect navigates the Spotfire® DecisionSite™ application into the same state that it had been when the annotation had originally been created.

In another embodiment, an annotation plugin extension is provided to a web application. (A web application is an application served from a web server and displayed on an internet browser. An example of a web application is the Entrez portal application for searching the National Center for Biotechnology Information (NCBI) data. (This web application can be found at www.ncbi.nlm.nih.gov/Entrez/.) The annotation plugin is preferably implemented and run on any of a web server (for a specific application), a web proxy server or an internet browser (as an internet browser plugin). In the case of the web proxy server and the internet browser plugin implementations, the annotation plugin is written for the annotation of web applications which were never designed to be annotated. The annotation plugin, in one embodiment, monitors URL's that are being accessed by the internet web browser. The URL is used to determine what application was being accessed and the current state which that application is in. The annotation plugin is preferably configured to determine on a server by server basis, which part of the URL relates to the web application currently being run and which part determines the current state of the application.

For example the URL:
"appserver.examplecompany.com/applications/
documentexp?name=doc1&page=3&state=53678712"
The URL is divided into 2 parts, the section before the query string and the section after the query string.
The section of the URL before the query string:
"appserver.examplecompany.com/applications/document-exp"
is used to determine the current application being displayed in the web browser. This string is used to identify the application (Application ID).
The section after the query string:
"name=doc1&page=3&state=53678712"
is used to record the current applications state (Application State).

HTTP POST data (as Defined in the IETF's Request for Comments #2616, Section 9.5) is preferably used to determine the applications current view state in a similar fashion.

Preferably, a user of the annotation system GUI adds an annotation to the annotation store annotating a webpage (or view) by clicking on a button displayed in the web browsers user interface. The user is presented with a form in which to fill annotation data. This form data is then submitted to the annotation store along with the Application ID and Application State.

The annotation plugin determines when the application is being accessed by comparing stored application ID's with the web browser's current URL. The annotation plugin determines whether there are matches between the stored Application ID's and the current web browser's URL for the stored annotations. A list of these matched annotations relating to the web application are displayed to the user. By accessing one of these annotations the web application is driven into the state of the application at which the annotation was originally written by using the stored application state portion of the URL and presenting this view, in the web browser, to the user.

Figure 11:
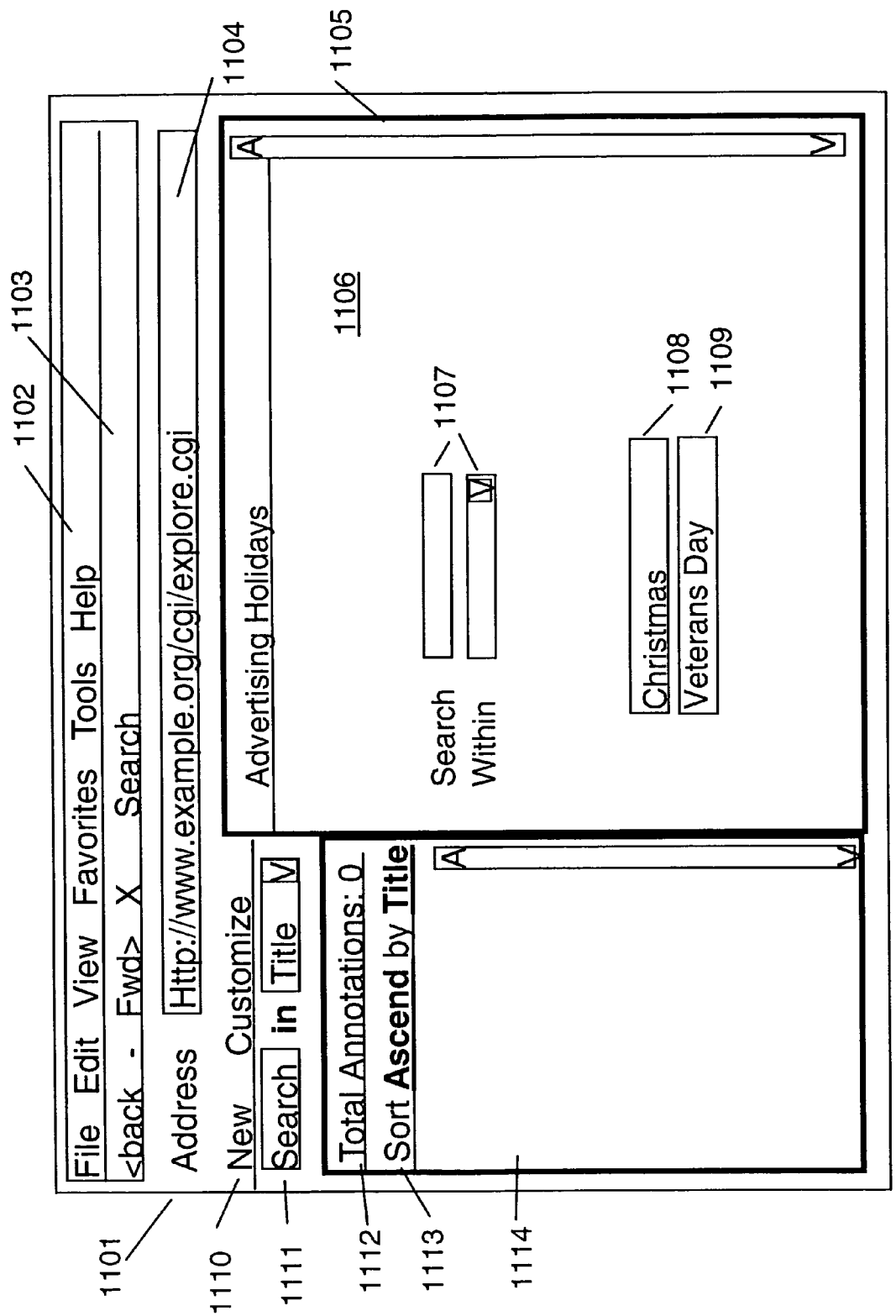
FIGS. 11 to 17 illustrate an example series of windows according to the present invention.
Figure 12:
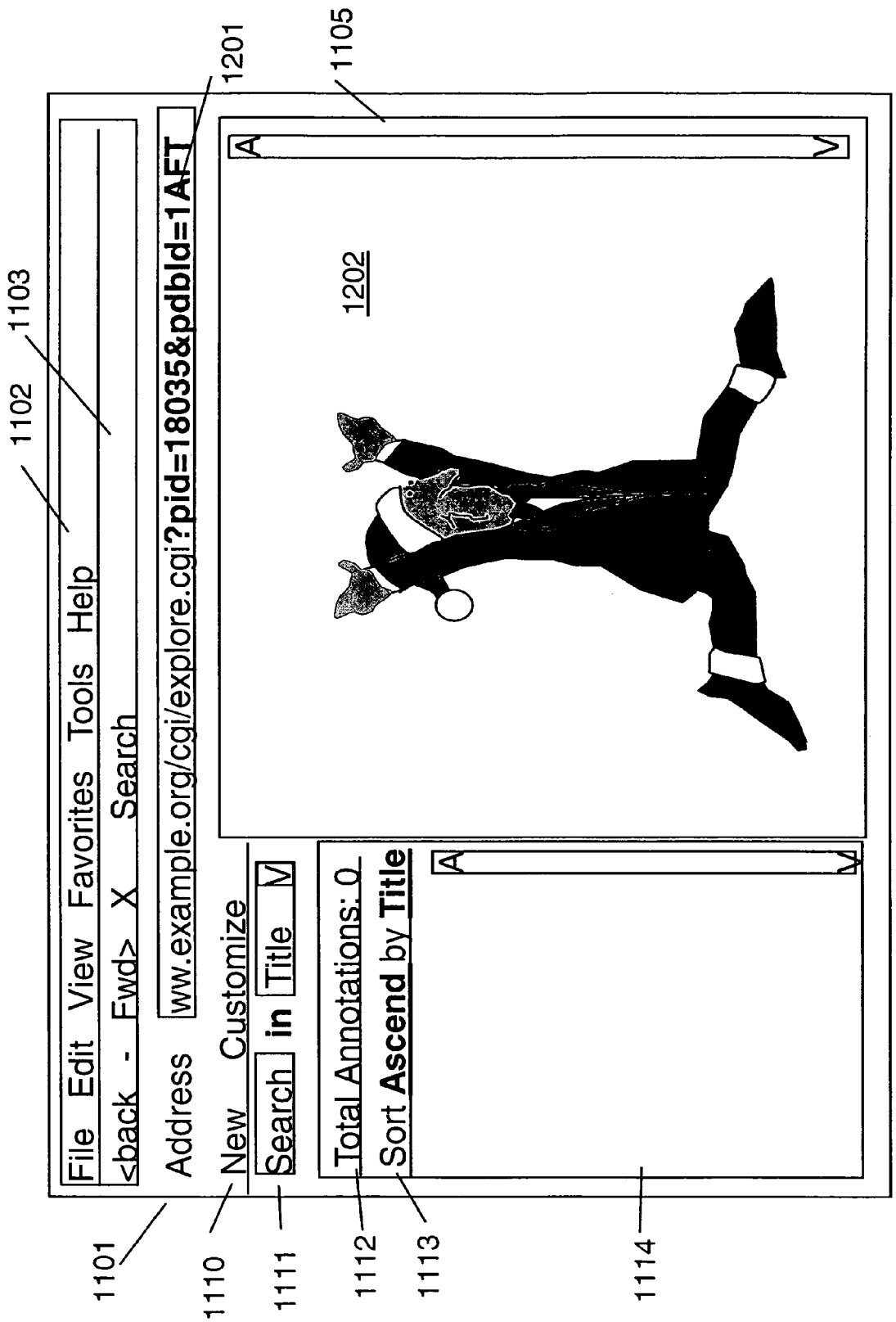
Figure 13:
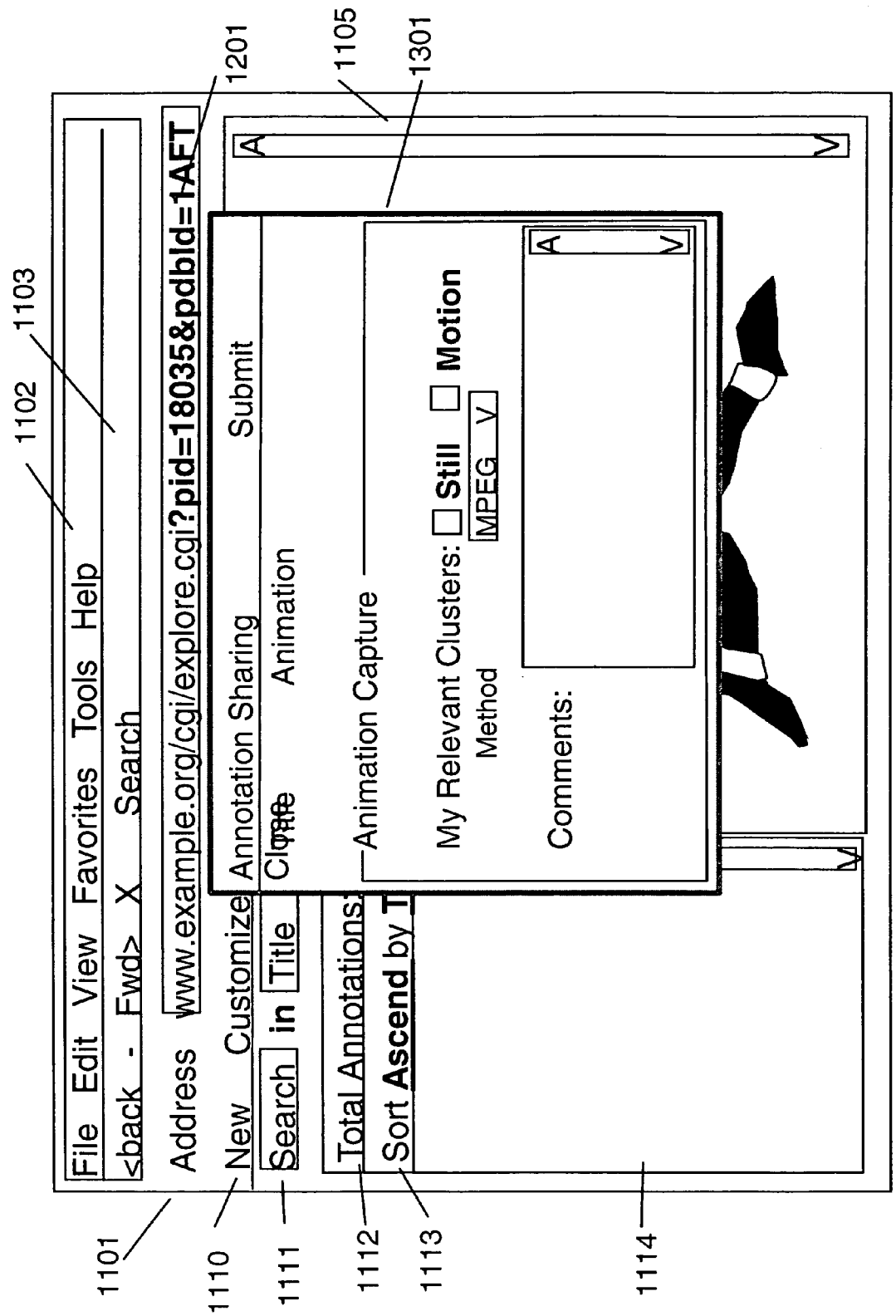
Figure 14:
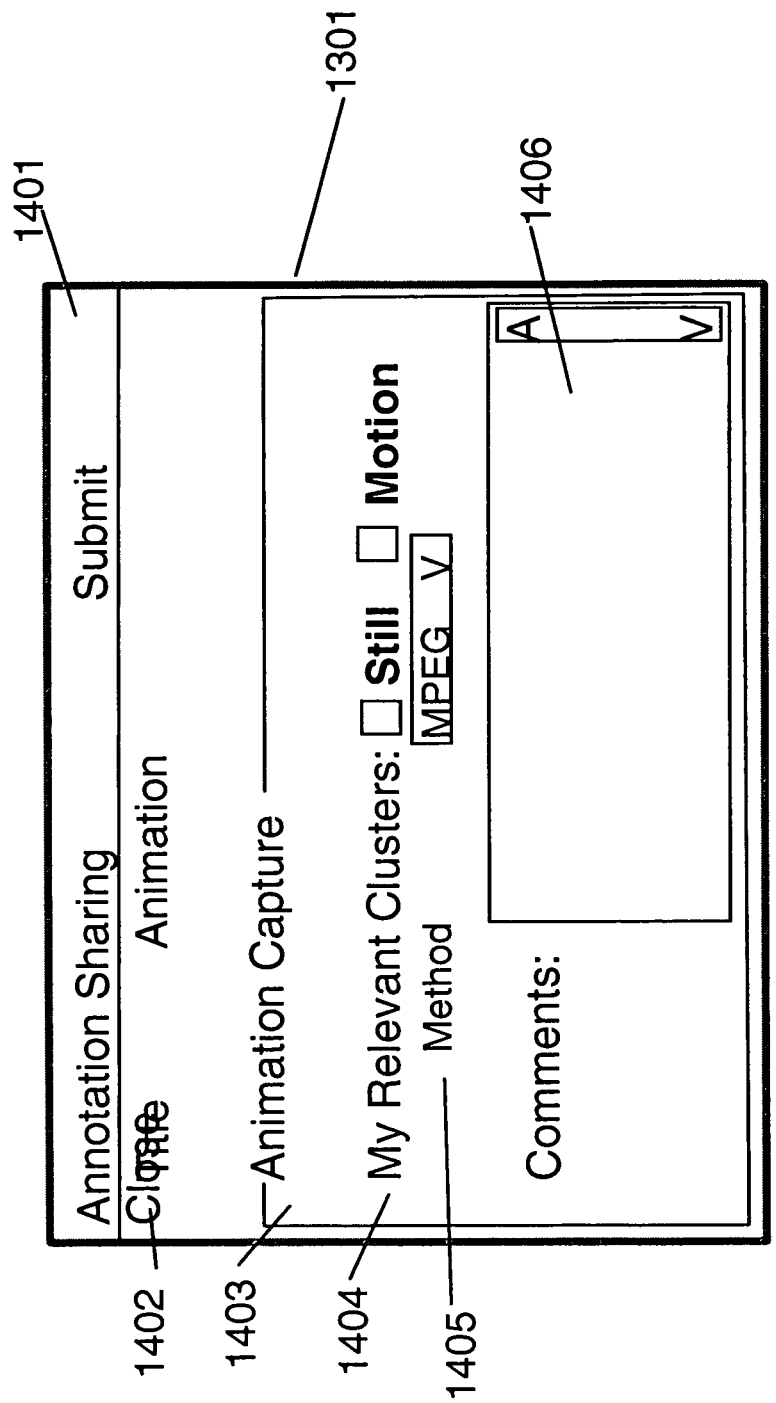
Figure 15:
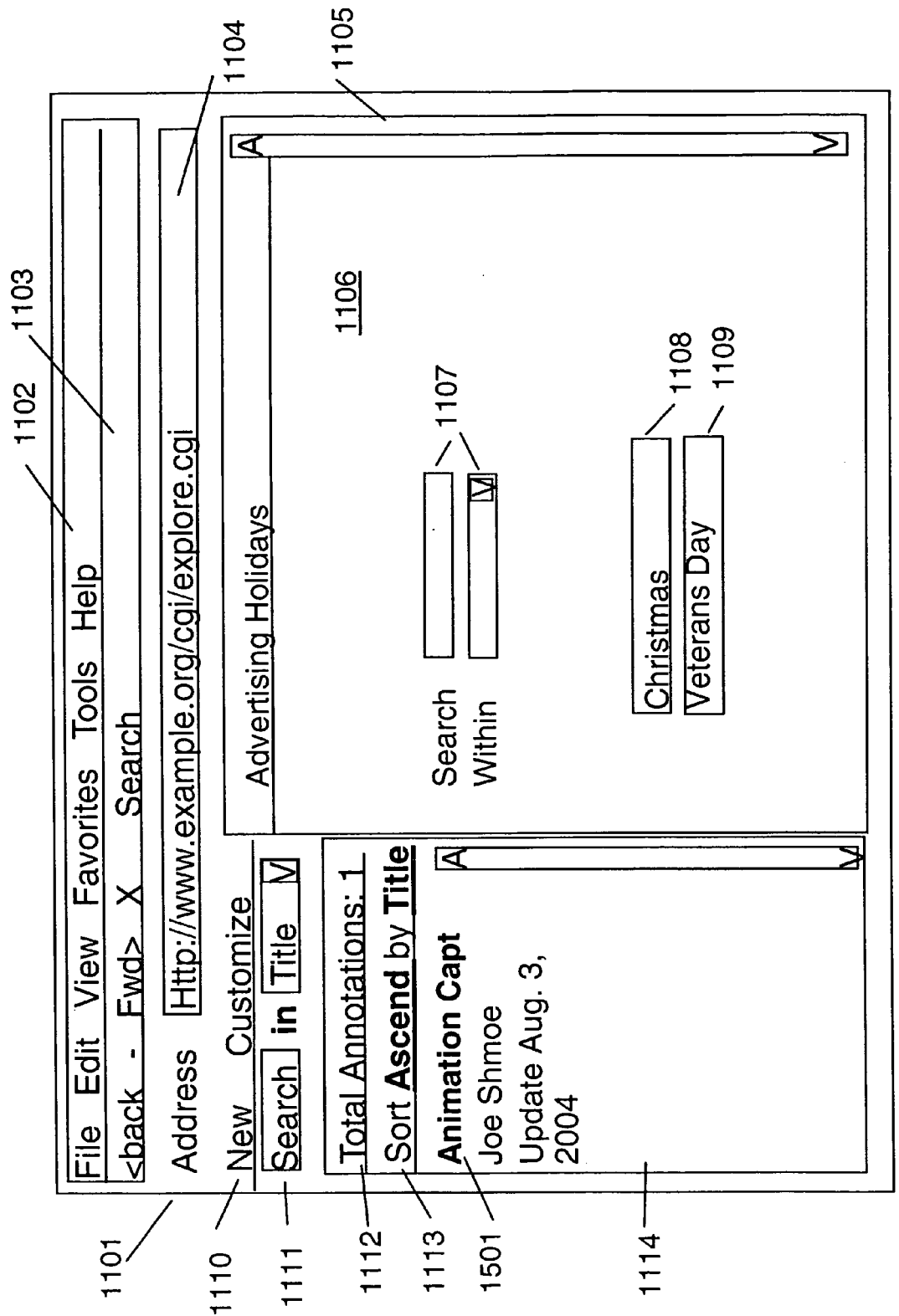

In an example embodiment (referring to FIG. 11), a first user opens a world wide web browser window 1101 having familiar window function bars 1102 1103 for editing, navigating, help and the like. The URL address is preferably displayed in an address window 1104. An annotation function is invoked presenting an annotation partition 1113 and an application partition 1105. The application partition 1105 displays the target window 1106 of the URL address home page 1104 in this example and the annotation partition displays annotation information. In the example, the annotation partition 1114 provides annotation search functions 1111 for navigating in the annotation database and also annotations 1112 relating to the page. The annotation partition 1114 further provides widgets 1110 for operating in the annotation window including a GUI widget for creating a new annotation, sorting 1113 annotations and a GUI widget for customizing an annotation 1110. The first user then navigates to a related webpage "Http://www.example.org/cgi/explore.cgi" that displays a webpage 1106 titled "Advertising Holidays". The web site 1106 is related to the advertising of holidays and provides various information for Advertisers to create, monitor and change advertisements related to holidays. For instance the webpage 1106 includes search widgets 1107 for searching for associated webpages as is known in the art. Other widgets 1108 1109 provide links to webpages according to specific topics such as Christmas or Veterans day as shown. Referring to FIG. 12, the first user navigates from the home page 1106 to a target page 1202 of the website, the target page 1202 having the URL address 1201 of "Http://www.example.org/cgi/explore.cgi?pid=18035&pdbId=1AF" made up of the domain "example.org/cgi/explore.cgi" and the CGI state "pid=18035&pdbId=1AF". The target page in a preferred embodiment is presented based on accumulated state information accumulated in the process of navigation. In the present example, the state information is represented by a portion of the address 1201 to the right of the "?" (?pid=18035&pdbId=1AF), the portion used by CGI Script to identify the state of the transient application displayed 1202. The first user desires to annotate this page. The first user notes that no annotation exists selects an option (preferably "New" presented as a GUI widget 1110) and an annotation window (referring to FIG. 13) 1301 is displayed preferably overlaying a portion of the browser display 1101. In an optional embodiment, a GUI widget (not shown) permits saving a screen capture of the page such that if the page is modified later or if there is transient information on the page (such as a date stamp or a stock market ticker tape) the transient information can be viewed at a later time. The annotation window (referring to FIG. 14) 1301 may contain a bar 1401 including widgets for managing annotation such as submitting the new annotation or closing the annotation window 1301. The annotation window further preferably provides a title 1402 of Animation for the annotation topic. The annotation window provides various navigation and selection widgets 1404 1405 for defining subcategories of annotations. The annotation window 1301 preferably provides a comments window 1406 for entering new annotation using techniques known in the art. When the first user has created his annotation, he submits it by selecting the submit widget 1401. Referring to FIG. 15, the annotation window 1301 then closes and information 1501 about the new annotation is displayed in the annotation partition 1114. The information may include the title of the Annotation "Animation Capture", thee name of the annotator "Joe Shmoe" and the date the annotation was created or modified.

Figure 16:
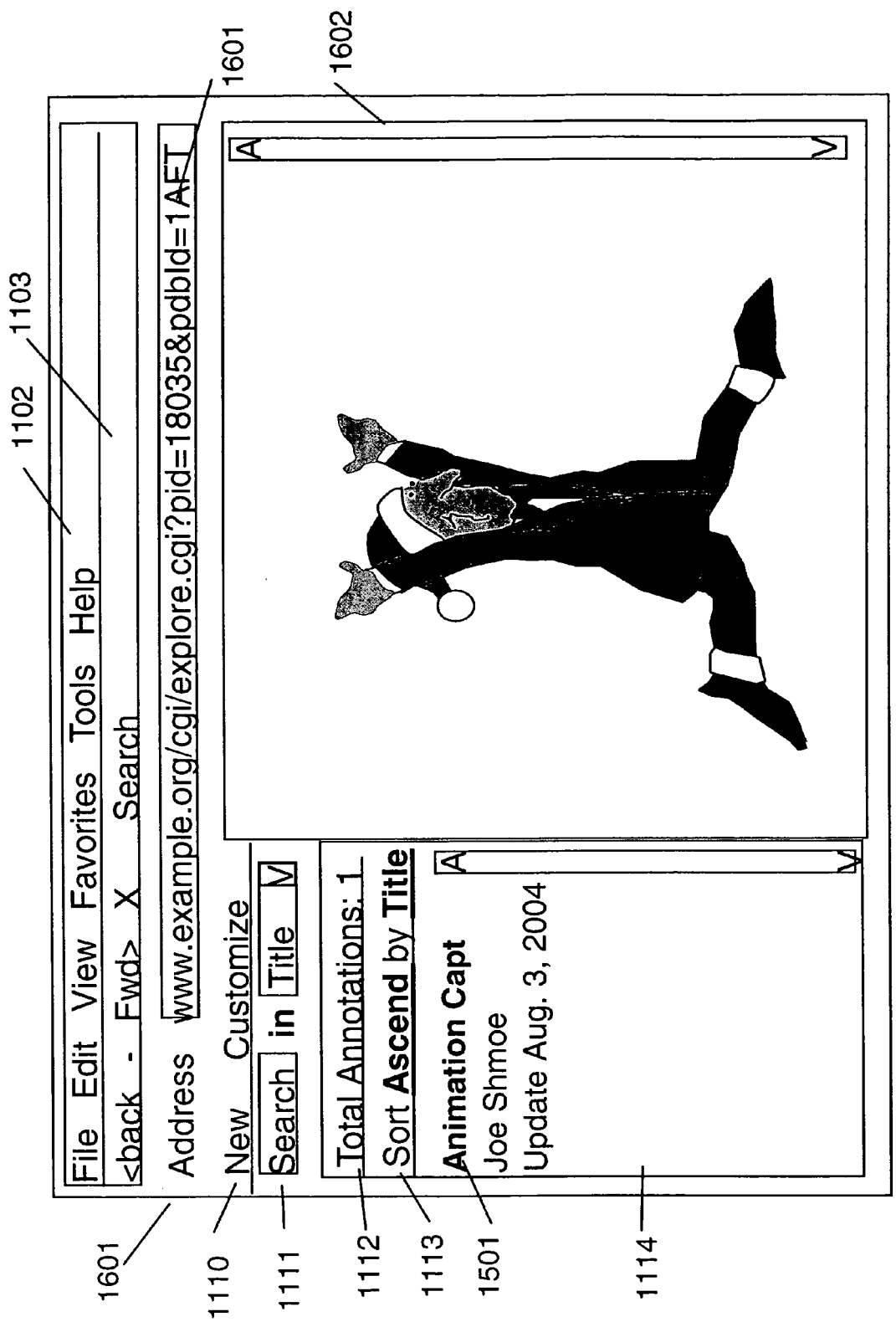

Referring to FIG. 15, subsequently a second user (or possible the first user again) access the Advertising Holidays site 1105 according to its URL address 1104. The second user observes that annotations exist and in fact only 1 annotation 1112 exists for the site by observing the annotation partition 1114. Referring to FIG. 16, the user selects the annotation preferably by selecting the title 1501 "Animation Capture" in the annotation partition 1114 which causes a link to execute navigating the second user to the annotated target page as identified by the portion of the URL address 1601 to the right of the "?". The Target page is displayed in the application partition 1602. In an embodiment, a GUI widget is provided to optionally display a previously saved screen capture of the original target page (not shown), the screen capture saved when the annotation was submitted.

Figure 17:
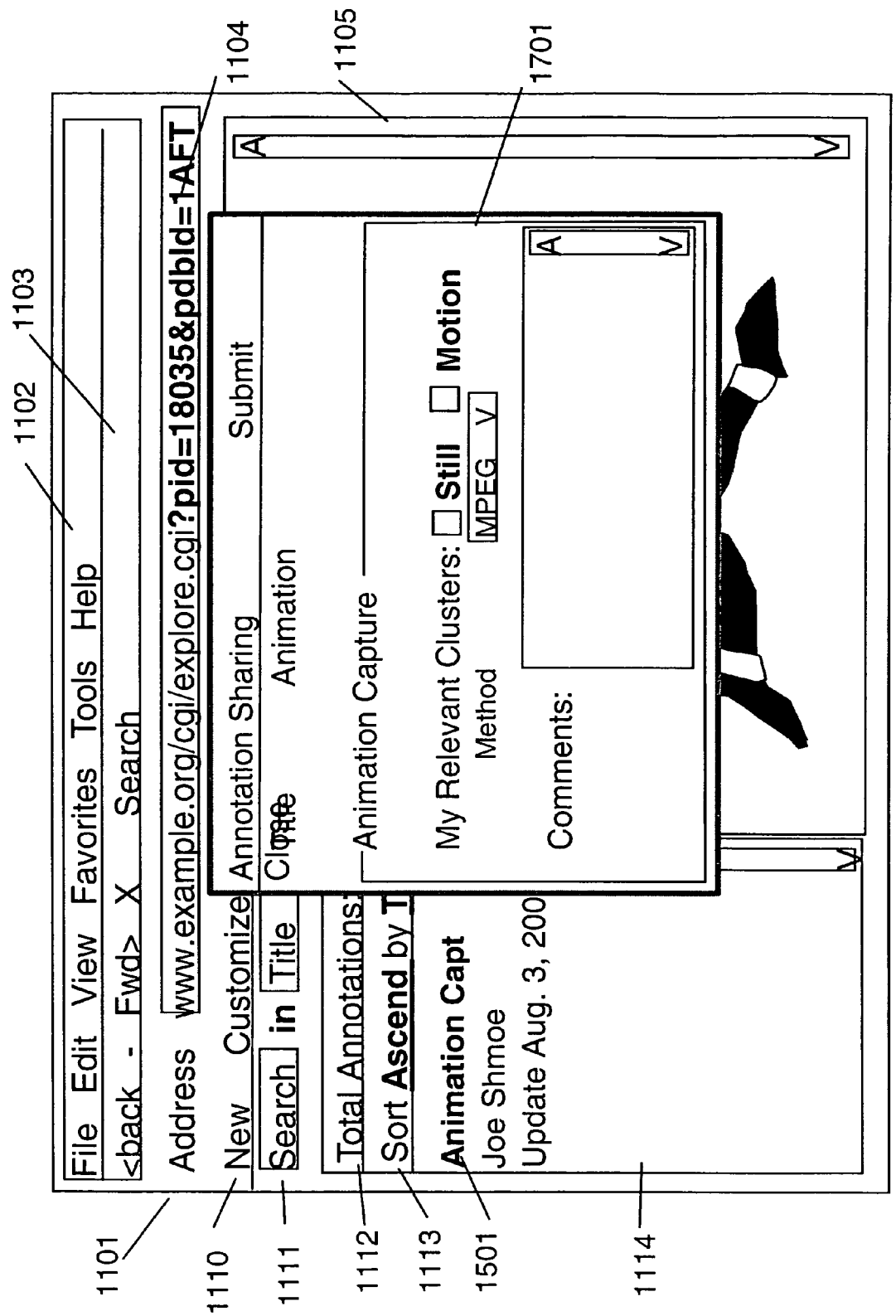

Referring to FIG. 17, the annotation window 1701 is displayed and presents in comments field the annotation information. The annotation information is preferably any one of text, audio, video or a link to a media. The second user can elect to create a new annotation for the screen, edit the existing annotation (assuming the second user has credentials permitting the editing) or just exit the annotation mode. Preferably multiple annotation windows can be open at any one time.

Figure 18:
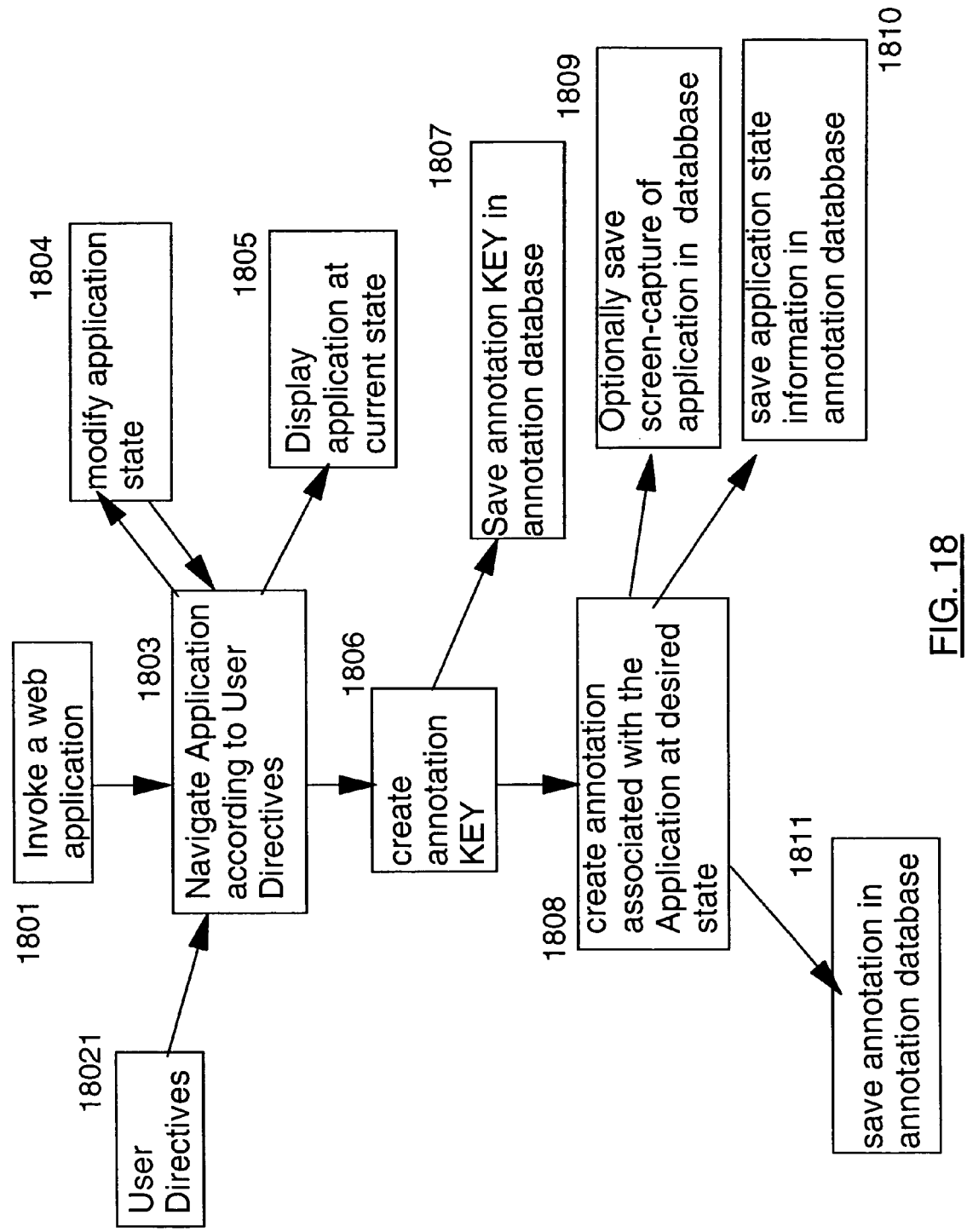
FIG. 18 is illustrative of steps for creating an annotation according to the invention.

Referring to FIG. 18, the method for annotating a transient state of a computer displayed application is shown. According to the method, a web application is invoked 1801 by navigating to a page representing the application. The application is navigated 1803 by a user 1802 providing GUI inputs interactively with prompts from the application. At some point the application has navigated 1804 to a transient state displayed as the current state 1805. An annotation KEY is created 1806 representing the application as well as state information about the state of the application at the current state. The Key 1807 and state 1810 information is saved 1807 in the annotation database. The user creates an annotation 1808 preferably text, which annotation is associated with the application at the desired state using the KEY information to identify the relationship. The Annotation created is saved 1811 in the annotation database.

Figure 19:
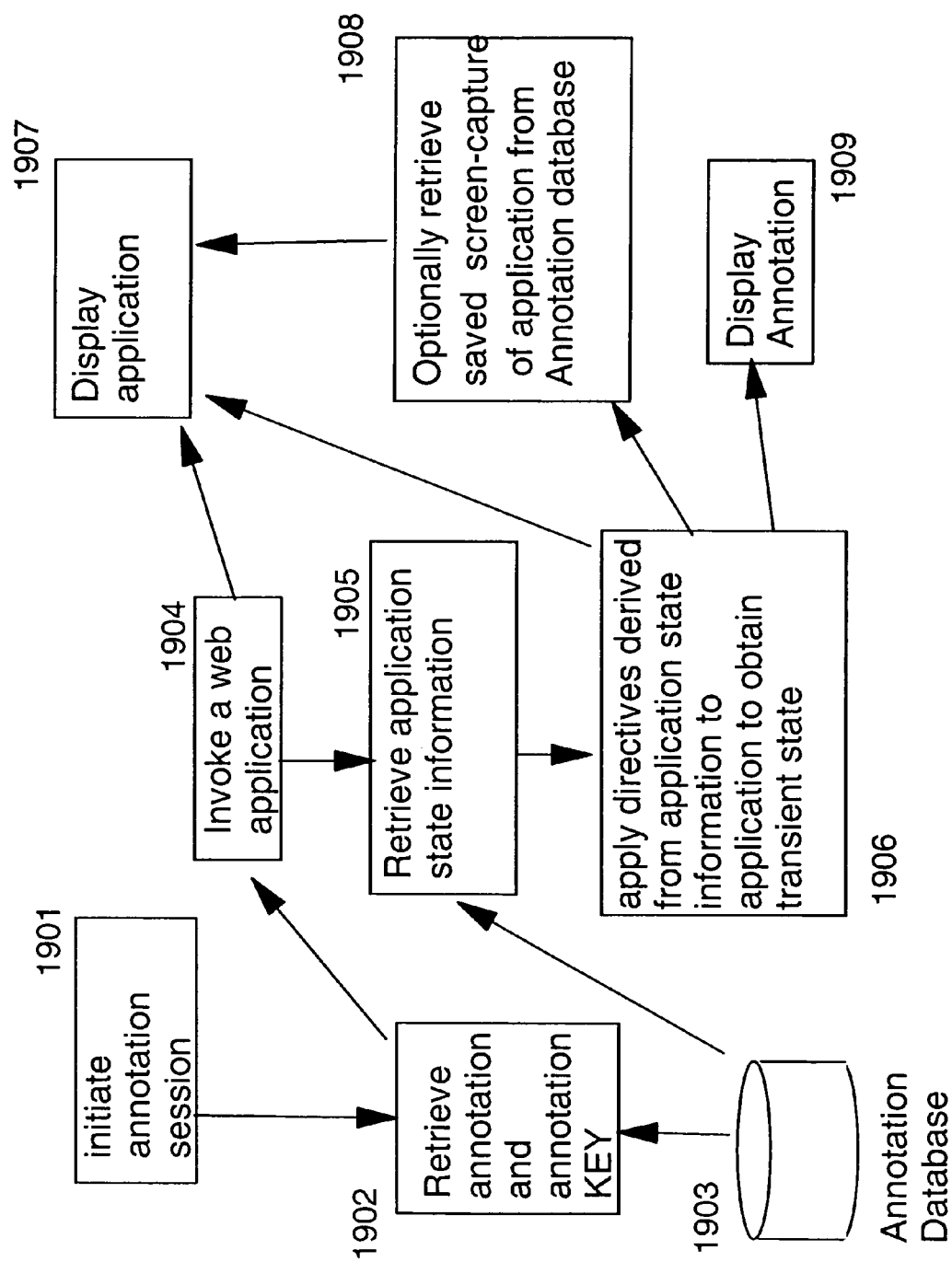
FIG. 19 is illustrative of steps for retrieving an annotation according to the invention.

Referring to FIG. 19, when a user is interested in investigating existing annotations, he initiates an annotation session 1901 by invoking an annotation application. The annotation application provides a GUI window adjunct to the application window at the user's terminal. The user GUI input invokes the application of interest 1904 which is displayed at a home state 1907 at the users' terminal. In response to GUI prompts and user GUI inputs, the user selects an annotation of interest. The annotation application retrieves the annotation and annotation key 1902 as well as state information 1905 from the annotation database 1903. The annotation application applies directives derived from the retrieved application state information to the application to navigate the application to the transient state defined by the application state information 1906. The application at the transient state is displayed 1907 at the users terminal. Furthermore the annotation is displayed 1909 preferably in a separate window. Optionally in one embodiment 1908 a screen capture of the transient state of the application as it appeared when the annotation was created is retrieved preferably from the annotation database and displayed 1907 at the user terminal.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed is:

1. A method for displaying a transient state of an annotated web application view for which there is no persistent object against which the annotation can be referenced wherein the application state has changed, the method comprising the steps of:
   initiating an annotation session by invoking an annotation application which displays the application at its home state with annotations available for the application;
   selecting from the displayed annotations, an annotation for relating the annotation to a displayable application view as the displayable application exists at a given time;
   retrieving the selected annotation, annotation key, and application state information from the annotation database;
   applying, with a computer, directives derived from the retrieved application state information within a URL to navigate to the transient state defined by the application state information to achieve the state of the application program at the time the original annotation is retrieved from the annotation database to impel the application to that state after which the annotation can be shown in the correct context; and
   displaying the application at the application state determined by the application state information.

2. The method according to claim 1 comprising wherein the displayable application comprises one or more web pages.

3. The method according to claim 1 comprising the further steps of:
   retrieving a screen capture from the database, the location of the screen capture associated with the first annotation, the screen capture providing a view of the application as it appeared when the first annotation was created;
   displaying the screen capture.

4. The method according to claim 3 wherein the location of the screen capture is stored in the annotation.

5. The method according to claim 3 wherein the screen capture is displayed when a GUI command to display the screen capture is activated.

6. The method according to claim 1 comprising the further step of displaying the retrieved annotation.

7. A method for annotating a transient state of a computer displayed web application wherein the state of the computer displayed web application changes, the method comprising:
   displaying a first web application view of an application program based on a first Universal Resource Locator (URL), the first URL comprising a location indicator indicating where the application program is executing and a name of the application program;
   responsive to user input, navigating to a second web application view of the application program, the second web application view having a second URL, the second URL comprising the location indicator, the name of the application program and state information, the state information for recreating the second web application view;
   creating an annotation record, the annotation record for annotating the second web application view;

creating an annotation key, the annotation key comprising information for relating the created annotation record with the application program; and saving the created annotation key, the state information for recreating the second web application view and the created annotation record in an annotation store for achieving the state of the application at the time the original annotation is retrieved from the annotation store to impel the application to that state after which the annotation can be shown in the correct context.

8. The method according to claim 7 wherein the displayable application comprises one or more world wide web pages.

9. The method according to claim 7 comprising the further step of saving a screen-capture view of the application at the desired state in the annotation database.

10. The method according to claim 7 wherein the annotation database is a relational database.

11. The method according to claim 7, wherein the URL includes a "?", wherein the state information is a portion of the URL disposed to the right of the "?".

12. The method according to claim 7, wherein the state information comprises any one of:
the data source that is being used to create the view for the user;
what database views on that data are actually open;
what display components are in use for those views;
the window sizes of those display components;
a database record that is active or selected;
what regions of the screen has been selected; and
where the cursor is currently positioned.

13. A system for annotating a transient state of a computer displayed application wherein the state of the computer displayed application changes, the system comprising:
a network;
a first computer system in communication with the network wherein the computer system includes instructions to execute a method comprising the steps of:
displaying a first web application view of an application program based on a first Universal Resource Locator (URL), the first URL comprising a location indicator indicating where the application program is executing and a name of the application program;
responsive to user input, navigating to a second web application view of the application program, the second web application view having a second URL, the second URL comprising the location indicator, the name of the application program and state information, the state information for recreating the second web application view;
creating an annotation record, the annotation record for annotating the second web application view;
creating an annotation key, the annotation key comprising information for relating the created annotation record with the application program; and
saving the created annotation key, the state information for recreating the second web application view and the created annotation record in an annotation store for achieving the state of the application at the time the original annotation is retrieved from the annotation store to impel the application to that state after which the annotation can be shown in the correct context.

14. The system according to claim 13 wherein the displayable application comprises one or more world wide web pages.

15. The system according to claim 14 wherein the URL includes a "?", wherein the state information is a portion of the URL disposed to the right of the "?".

16. The system according to claim 15 wherein the state information comprises any one of:
the data source that is being used to create the view for the user;
what database views on that data are actually open;
what display components are in use for those views;
the window sizes of those display components;
a database record that is active or selected;
what regions of the screen has been selected; and
where the cursor is currently positioned.

17. The system according to claim 13 comprising the further step of saving a screen-capture view of the application at the desired state in the annotation database.

18. The system according to claim 13 wherein the annotation, the annotation database is a relational database.

19. A system for displaying a transient state of an annotated web application wherein the application has changed, the system comprising:
a network;
a first computer system in communication with the network wherein the computer system includes instructions to execute a method comprising the steps of:
initiating an annotation session by invoking an annotation application which displays the application at its home state with annotations available for the application;
selecting from the displayed annotations, an annotation for relating the annotation to a displayable application view as the displayable application exists at a given time;
retrieving the selected annotation, annotation key, and application state information from the annotation database;
applying, with a computer, directives derived from the retrieved application state information within a URL to navigate to the transient state defined by the application state information to achieve the state of the application program at the time the original annotation is retrieved from the annotation database to impel the application to that state after which the annotation can be shown in the correct context; and
displaying the application at the application state defined by the application state information.

20. The system according to claim 19 comprising wherein the displayable application comprises one or more web pages.

21. The system according to claim 19 comprising the further steps of:
retrieving a screen capture from the database, the location of the screen capture associated with the first annotation, the screen capture providing a view of the application as it appeared when the first annotation was created;
displaying the screen capture.

22. The system according to claim 21 wherein the location of the screen capture is stored in the annotation.

23. The system according to claim 19 wherein the screen capture is displayed when a GUI command to display the screen capture is activated.

24. The system according to claim 19 comprising the further step of displaying the retrieved annotation.

25. A computer program product for annotating a transient state of a computer displayed application wherein the state of the computer displayed application changes, the computer program product comprising:
a non-transitory computer readable storage medium readable by a processing circuit and storing instructions for execution by a processing circuit for performing a method comprising the steps of:
displaying a first web application view of an application program based on a first Universal Resource Locator (URL), the first URL comprising a location indicator indicating where the application program is executing and a name of the application program;

responsive to user input, navigating to a second web application view of the application program, the second web application view having a second URL, the second URL comprising the location indicator, the name of the application program and state information, the state information for recreating the second web application view;

creating an annotation record, the annotation record for annotating the second web application view;

creating an annotation key, the annotation key comprising information for relating the created annotation record with the application program; and saving the created annotation key, the state information for recreating the second web application view and the created annotation record in an annotation store for achieving the state of the application at the time the original annotation is retrieved from the annotation store to impel the application to that state after which the annotation can be shown in the correct context.

26. The computer program product according to claim 25 wherein the displayable application comprises one or more world wide web pages.

27. The computer program product according to claim 26 wherein the URL includes a "?", wherein the state information is a portion of the URL disposed to the right of the "?".

28. The computer program product according to claim 27 wherein the state information comprises any one of:

the data source that is being used to create the view for the user;

what database views on that data are actually open;

what display components are in use for those views;

the window sizes of those display components;

a database record that is active or selected;

what regions of the screen has been selected; and where the cursor is currently positioned.

29. The computer program product according to claim 27 comprising the further step of saving a screen-capture view of the application at the desired state in the annotation database.

30. The computer program product according to claim 27 wherein the annotation, the annotation database is a relational database.

31. A computer program product for displaying a transient state of an annotated application wherein the application has changed, the computer program product comprising:

a non-transitory computer readable storage medium readable by a processing circuit and storing instructions for execution by a processing circuit for performing a method comprising the steps of:

initiating an annotation session by invoking an annotation application which displays the application at its home state with annotations available for the application;

selecting from the displayed annotations, an annotation for relating the annotation to a displayable application view as the displayable application exists at a given time;

retrieving the selected annotation, annotation key, and application state information from the annotation database;

applying, with a computer, directives derived from the retrieved application state information within a URL to navigate to the transient state defined by the application state information to achieve the state of the application program at the time the original annotation is retrieved from the annotation database to impel the application to that state after which the annotation can be shown in the correct context; and displaying the application at the application state defined by the application state information.

32. The computer program product according to claim 31 comprising wherein the displayable application comprises one or more web pages.

33. The computer program product according to claim 31 comprising the further steps of:

retrieving a screen capture from the database, the location of the screen capture associated with the first annotation, the screen capture providing a view of the application as it appeared when the first annotation was created;

displaying the screen capture.

34. The computer program product according to claim 33 wherein the location of the screen capture is stored in the annotation.

35. The computer program product according to claim 33 wherein the screen capture is displayed when a GUI command to display the screen capture is activated.

36. The computer program product according to claim 31 comprising the further step of displaying the retrieved annotation.

37. A computer implemented service for annotating a transient state of a computer displayed application wherein the state of the computer displayed application, the service comprising the steps of:

navigating a displayed application from a home application state to a desired transient application state, the navigation responsive to user directives;

providing a GUI annotation interface to the user;

receiving user annotation by way of the GUI annotation interface, the user annotation associated with the desired transient application of the computer displayed application as the application exists at a given time;

navigating to the home application state; and responsive to a request for the annotation for the application when at a state other than the desired transient application state at said given time, displaying the annotation and the application at the desired transient application state as the application exists at said given time for achieving the state of the application at the time the original annotation is retrieved from the annotation store to impel the application to that state after which the annotation can be shown in the correct context.

* * * * *